(12) United States Patent
Guo et al.

(10) Patent No.: US 12,031,592 B2
(45) Date of Patent: Jul. 9, 2024

(54) SOFT ACTUATOR, ITS WORKING METHOD AND ROBOT

(71) Applicant: Shandong University, Jinan (CN)

(72) Inventors: Kai Guo, Jinan (CN); Yuan Lu, Jinan (CN); Jie Sun, Jinan (CN)

(73) Assignee: SHANDONG UNIVERSITY (CN)

( * ) Notice: Subject to any disclaimer, the term of this patent is extended or adjusted under 35 U.S.C. 154(b) by 0 days.

(21) Appl. No.: 17/987,885

(22) Filed: Nov. 16, 2022

(65) Prior Publication Data
US 2023/0150121 A1    May 18, 2023

(30) Foreign Application Priority Data

Nov. 16, 2021 (CN) .......................... 202111354920.X

(51) Int. Cl.
| | | |
|---|---|---|
| F16D 27/14 | (2006.01) | |
| B25J 9/12 | (2006.01) | |
| F16D 27/12 | (2006.01) | |
| B25J 19/06 | (2006.01) | |

(52) U.S. Cl.
CPC .............. *F16D 27/14* (2013.01); *B25J 9/126* (2013.01); *F16D 27/12* (2013.01); *B25J 19/068* (2013.01); *Y10S 901/19* (2013.01)

(58) Field of Classification Search
CPC . F16D 27/14; F16D 27/12; B25J 9/126; B25J 19/068; Y10S 901/19
USPC ........................ 192/48.2; 464/67.1
See application file for complete search history.

(56) References Cited

U.S. PATENT DOCUMENTS

| | | | | |
|---|---|---|---|---|
| 919,767 | A | * | 4/1909 | Raymer ............. F16F 15/1234 464/67.1 |
| 2,673,475 | A | * | 3/1954 | Ebsworth ............ F16H 61/0269 |
| 2018/0133905 | A1 | | 5/2018 | Smith et al. |

FOREIGN PATENT DOCUMENTS

| | | |
|---|---|---|
| CA | 2505664 A1 | 10/2005 |
| CN | 101077579 A | 11/2007 |
| CN | 101718315 A | 6/2010 |
| CN | 104214234 A | 12/2014 |
| CN | 107208714 A | 9/2017 |
| CN | 109015739 A | 12/2018 |

OTHER PUBLICATIONS

Irfan Hussain, et al., Design and Control of a Discrete Variable Stiffness Actuator With Instant Stiffness Switch for Safe Human-Robot Interaction, IEEE Access, 2021, pp. 118215-118231, vol. 9.

* cited by examiner

*Primary Examiner* — Greg Binda

(57) ABSTRACT

A soft actuator includes a power input shaft, and multiple electromagnetic clutches are coaxially installed in series on the power input shaft. A bending elastic part is arranged between the thrust plate of each electromagnetic clutch and the gear frame of the electromagnetic clutch.
The bending elastic part is installed on the sleeve of the gear frame and in contact with the baffle of the gear frame. The bending elastic part is connected with the clutch output gear of the electromagnetic clutch through the gear frame. The gear frame is fixedly connected with the clutch output gear and rotates coaxially.

19 Claims, 16 Drawing Sheets

SOFT ACTUATOR, ITS WORKING METHOD AND ROBOT

CROSS REFERENCE TO THE RELATED APPLICATIONS

This application is based upon and claims priority to Chinese Patent Application No. 202111354920.X, filed on Nov. 16, 2021, the entire contents of which are incorporated herein by reference.

TECHNICAL FIELD

The present invention relates to the technical field of robots, in particular to a soft actuator, its working method, and robot.

BACKGROUND

The statement in this section only provides background technical information relevant to the present invention, it does not necessarily constitute prior technology.

With the continuous development of robot technology, robots are not only applied to traditional industrial manufacturing, production, and assembly, but also human-computer interaction fields such as education services, medical rehabilitation, and power exoskeletons. Due to the high accuracy requirements of traditional robots, they have higher rigidity, faster system response, and high bandwidth, those features have determined that they cannot perform effectively on shock mitigation and absorption, which will cause serious damage to human-computer interaction. In the process of human-computer interaction, it is necessary to improve the safety and softness of robots. The method to improve the safety and softness of robots is divided into software and hardware parts. The software part improves the softness of the robot to a certain extent through the response control algorithm, such as force/position composite control. However, its external sensor system and control algorithm are more complex, and the sensor has poor stability affected by the environment. In terms of hardware, through the development of robot hardware, such as variable stiffness actuator (VSA), the output stiffness of the robot can be adjusted by physical adjustment, and the output stiffness of the variable stiffness mechanism can be adjusted to adapt to the stiffness requirements of the actuator in different applications. The interactive stiffness of robots in the human-computer interaction process is changed in real-time to achieve buffering and compliance control. When a collision and large mutation interaction force occur, the output stiffness of the robot is reduced, and vice versa. The output stiffness is larger to achieve safe compliance interaction while ensuring the control accuracy of robots. Variable stiffness principles in existing variable stiffness actuators can be divided into four categories:

1. Change the equilibrium position stiffness of the elastic element access system;
2. Change the ratio of the transmission lever stiffness;
3. Change the preload variable stiffness of variable elastic element;
4. Use the antagonistic variable stiffness of the double elastic element.

Although the above-mentioned principles and the corresponding driving actuators have many advantages, the inventors found that some problems in the existing variable stiffness actuators hinder their further promotion and application, such as the limited range of variable stiffness, the complex control algorithm, the coupling interference caused by the complex mechanism, the large friction of the stiffness adjustment mechanism, the small joint rotation angle, the slow response speed of variable stiffness and the large mechanical disturbance during stiffness adjustment.

SUMMARY

Because of the shortcomings of the existing technology, the purpose of this invention is to provide a soft actuator with a simple control algorithm, large variable stiffness range, simple structure, wider joint rotation angle, fast response speed of stiffness adjustment, and no mechanical disturbance during continuous variable stiffness. Through high and low-level signals, the number of elastic elements added to the soft actuator is controlled to adjust its output stiffness. The control method is simple, and the stiffness of the elastic elements added to the soft actuator is different, the theoretical range of the stiffness adjustment of the soft actuator can be from infinitesimal to infinity, with a wide range of stiffness adjustment. The method of transmitting torque reduced mechanical disturbance when the actuator continuously adjusts stiffness and increases system stability through a coaxial installation friction disc.

To achieve the above purpose, the present invention is realized by the following technical scheme:

The soft actuator includes a power input shaft, and a plurality of electromagnetic clutches are coaxially connected in series to the power input shaft. A bending elastic part is arranged between the thrust plate of each electromagnetic clutch and the electromagnetic clutch gear frame. The bending elastic part is installed on the sleeve of the gear frame and in contact with the baffle of the gear frame. The bending elastic part is connected to the clutch output gear of the electromagnetic clutch through the gear frame, and the gear frame is fixedly connected to the clutch output gear and rotates coaxially.

For the aforesaid soft actuator, the power input shaft is used to input torque, the torque is transmitted to the gear frame through the clutch output gear first and then transmitted through the thrust plate in contact with the bending elastic part. Whether the bending elastic part is connected to the power transmission chain is controlled by changing the power state of the electromagnetic coil of the electromagnetic clutch. The output stiffness of the soft actuator is adjusted by the stiffness of the bending elastic part. The number of bending elastic parts added to the soft actuator is controlled to realize different stiffness adjustments of the soft actuator through the different combinations of multiple electromagnetic clutch power states.

For the aforesaid soft actuator, the gear frame and the clutch output gear are tightly connected by the same modulus of internal and external gears. The internal and external gears only play the role of fastening connection, there is no relative rotation between the two gears.

For the aforesaid soft actuator, two bending elastic parts are arranged symmetrically with one end of each bending elastic part set on both ends of gear frame sleeves and the other end contacted with the thrust plate. The symmetrically arranged bending elastic parts can avoid the mechanical vibration of the soft actuator when rotating in two directions and ensure that the two directions have the same stiffness setting.

For the aforesaid soft actuator, the thrust plate is fixed on the outer shell which is arranged outside the electromagnetic clutch, so that the torque can be transmitted to the outer shell through the thrust plate and output through the power output shaft.

For the aforesaid soft actuator, the number of electromagnetic clutches is more than or equal to 3. The number of bending elastic parts added to the soft actuator can be changed through different combinations of the power-on states of each electromagnetic clutch, which realize the different stiffness adjustments of the soft actuator.

For the aforesaid soft actuator, the power output shaft is set on one side of the outer shell, and the outer shell is connected to the power input shaft through a bearing.

For the aforesaid soft actuator, there are encoders set on the power input shaft and the power output shaft respectively; the encoder on the power input shaft is used to measure its rotation angle, and the encoder on the power output shaft is coaxially mounted with the soft output shaft through a coupling to measure the rotation angle of the output shaft after stiffness adjustment.

The power input shaft is connected to the driving component, and the driving component and the encoder are respectively connected to the controller. The controller can be a PID controller, which can be used for the trajectory tracking effect of the soft actuator under different stiffness.

The aforesaid soft actuator also includes a conductive slip ring. The conductive slip ring is installed on the power input shaft and used for the rotation and connection of the internal electromagnetic separator, preventing the entanglement caused by the rotation of the line, and realizing the unlimited continuous rotation of the soft actuator. The actuator has a wide working angle and also solves the problem of the small rotation angle of the existing variable stiffness joint.

The aforesaid soft actuator also includes a force sensor mounted on the power output shaft to measure its output torque. The compression deflection angle can be obtained according to the difference between the two encoders, to obtain the relationship between the torque of the soft actuator and the compression deflection angle, which is used for the stiffness performance test of the soft actuator.

The present invention also discloses a working method of the soft actuator, including the following contents:

When the electromagnetic coil is energized, the generated magnetic force adsorbs the passive friction disc on the active friction disc and transmits the torque of the power input shaft to the passive friction disc through two friction discs. Finally, the torque is transmitted firstly from the clutch output gear to the gear frame and then transmitted to the outer shell and the power output shaft through the thrust plate in contact with the bending elastic part.

When the electromagnetic coil is powered off, the electromagnetic clutch coil loses magnetic force, at the same time, the passive friction disc and the active friction disc are separated and the power transmission is interrupted, the electromagnetic coil and the active friction disc will rotate independently with the power input shaft. After the power state change of the electromagnetic coil, whether the bending elastic part is connected to the power transmission chain is controlled, and the output stiffness of the soft actuator is adjusted by controlling the number of bending elastic parts added.

In the third aspect, the present invention also provides a robot with the aforesaid soft actuator.

The beneficial effects of the present invention are as follows:

1) The present invention uses the power input shaft to input torque, and the torque is transmitted to the gear frame through the clutch output gear, and then transmitted to the outer shell and the power output shaft through the thrust plate in contact with the bending elastic part. Through the change of the energization state of the electromagnetic coil of the electromagnetic clutch, it controls whether the bending elastic part is connected to the power transmission chain, and adjusts the output stiffness of the soft actuator through the stiffness of the bending elastic part. The number of bending elastic parts added to the soft actuator is controlled to realize different stiffness adjustments of the soft actuator through different combinations of the energization states of multiple electromagnetic clutches. The overall mechanical structure is simple, the mechanism has only slight changes and the variable stiffness response speed is fast when adjusting the stiffness. It has high stability and solves the problem of mechanical disturbance in the continuous variable stiffness of the existing technology.

2) The present invention can avoid the mechanical vibration of the soft actuator when rotating in two directions by symmetrically arranged bending elastic parts, and ensure that the two directions have the same stiffness setting.

3) The present invention uses two encoders of the power input shaft to measure its rotation angle, and the encoder of the power output shaft is coaxially installed with the soft output shaft through the coupling to measure the rotation angle of the output shaft after stiffness adjustment. The difference between the two encoders is the compression deflection angle of the elastic part.

4) The present invention can obtain the compression deflection angle through the difference between the two encoders, and obtain the torque output by the power output shaft through the force sensor to obtain the relationship between the soft actuator torque and the compression deflection angle, which is used for the stiffness performance test of the soft actuator.

5) The soft actuator of the present invention has a simple overall structure to reduce the coupling interference and adjusts the output stiffness of the system by controlling the number of elastic parts added to the soft actuator. The stiffness adjustment range is wide and the stiffness adjustment accuracy is high, which solves the problem of lateral buckling of prior arts in the stiffness adjustment process. The control strategy is mainly realized by different combinations of the power-on state of the electromagnetic clutch, and the output stiffness of the stiffness adjustment mechanism can be controlled without additional sensors. The control strategy of the whole stiffness adjustment is very simple, which reduces the complexity of the overall control system.

6) The present invention realizes the different stiffness adjustments of the soft actuator by controlling the number of bending elastic parts added to the soft actuator. The power input shaft is equipped with a conductive slip ring, which solves the problem of the small rotation angle of the existing variable stiffness joint.

BRIEF DESCRIPTION OF THE DRAWINGS

The drawings accompanying the specification forming part of the present invention are used to provide a further understanding of the present invention, the schematic embodiments of the present invention and its description are used to explain the present invention and do not constitute an improper qualification of the present invention

Figure 1:
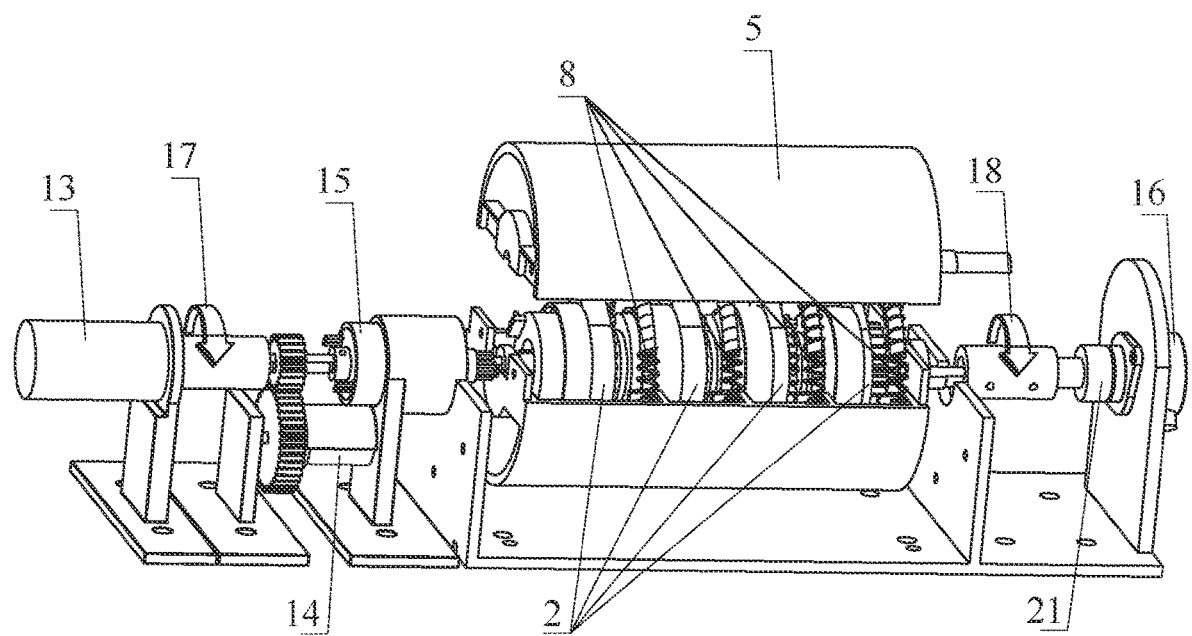
FIG. 1 is a complete machine transmission diagram of the soft actuator of this invention.

The spacing or size between parts is exaggerated to show the position of each other in the diagrams, the diagrams are only for schematic use.

Among them: 1. power input shaft, 2. electromagnetic clutch, 3. power output shaft, 4. clutch output gear, 5. outer shell, 6. electromagnetic clutch gear frame, 7. baffle, 8. bending elastic part, 9. sleeve, 10. electromagnetic coil, 11. active friction disc, 12. passive friction disc, 13. driving motor, 14. power input shaft encoder, 15. conductive slip ring, 16. power output shaft encoder, 17. power input shaft rotation angle $\theta_1$, 18. power output shaft rotation angle q, 19. compression deflection angle $\theta_2$, 20. thrust plate, 21. force sensor, 22. rigid component.

DETAILED DESCRIPTION OF THE EMBODIMENTS

It should be noted that the following details are illustrative and are intended to provide further explanations for the present invention. Unless otherwise specified, all technical and scientific terms used in the present invention have the same meaning as those commonly understood by ordinary technicians in the technical field to which the present invention belongs.

It is important to note that the term used here is only intended to describe the specific implementation, not intended to limit the exemplary implementation based on the present invention. As used here, the singular form is also intended to include the plural form unless explicitly stated otherwise in this invention. In addition, it should be understood that when the terms 'include' and/or 'comprise' are used in this specification, they indicate the presence of features, steps, operations, devices, components, and/or combinations of them;

As the existing technology introduced in the background technology, the control algorithm is complex, the variable stiffness range is limited, and the mechanism is complex, which leads to the problems of coupling interference, large friction in the stiffness adjustment mechanism, small joint rotation angle, slow variable stiffness response speed, and large mechanical disturbance during stiffness adjustment, the present invention provides a soft actuator.

Embodiment 1

In a typical embodiment of the present invention, a soft actuator is shown in FIG. 1, FIG. 2, FIG. 4, and FIG. 5, including a power input shaft 1, a plurality of electromagnetic clutch 2 coaxially connected in series to the power input shaft, and a bending elastic part 8 is arranged between the thrust plate 20 of each electromagnetic clutch and the electromagnetic clutch gear frame 6. The bending elastic part 8 is installed on sleeve 9 of the gear frame and contacts with baffle 7. The bending elastic part 8 is connected with the clutch output gear 4 of the electromagnetic clutch 2 through the gear frame, and the electromagnetic clutch gear frame 6 is fixedly connected with the clutch output gear 4 and rotates coaxially to form a power transmission chain from the clutch output gear 4 to the bending elastic part 8.

Figure 4:
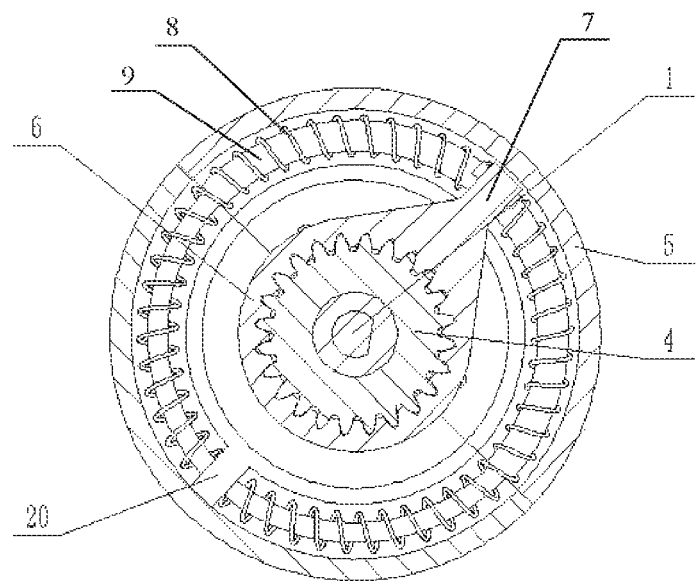
FIG. 4 is a top view of the stiffness adjustment mechanism of the present invention.
Figure 5:
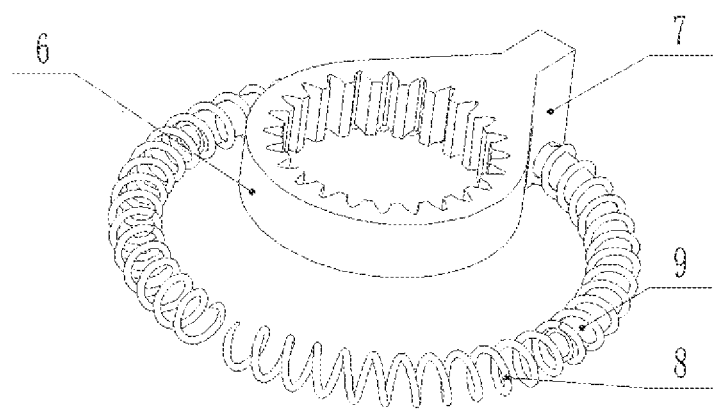
FIG. 5 is an assembly diagram of the electromagnetic clutch gear frame and bending elastic parts of the present invention.

Referring to FIG. 4 and FIG. 5, the bending elastic part 8 of this embodiment uses a bending spring as an elastic element. The electromagnetic clutch gear frame 6 and the clutch output gear 4 are tightly connected by the internal and external gears of the same modulus. The internal and external gears only play the role of fastening connection, and there is no relative rotation between the two parts. The electromagnetic clutch gear frame 6 is an annular structure. One end of the annular structure is connected to baffle 7, and both sides of baffle 7 are connected to two arc sleeves 9. Sleeve 9 is used to fix the bending elastic part.

Figure 7:
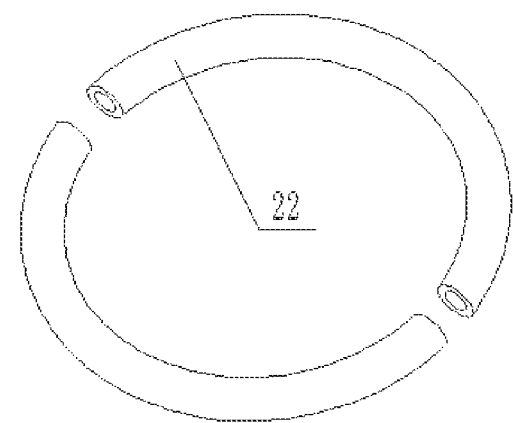
FIG. 7 is a diagram of the replaceable rigid component of the present invention.
Figure 8:
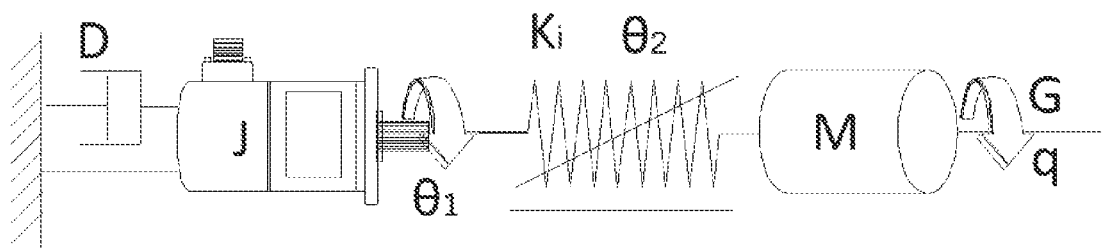
FIG. 8 is a diagram of the theoretical model for analyzing actuator dynamics

In other examples, as shown in FIG. 7, the bending elastic is replaced by the curved electromagnetic clutch 2.

Figure 6:
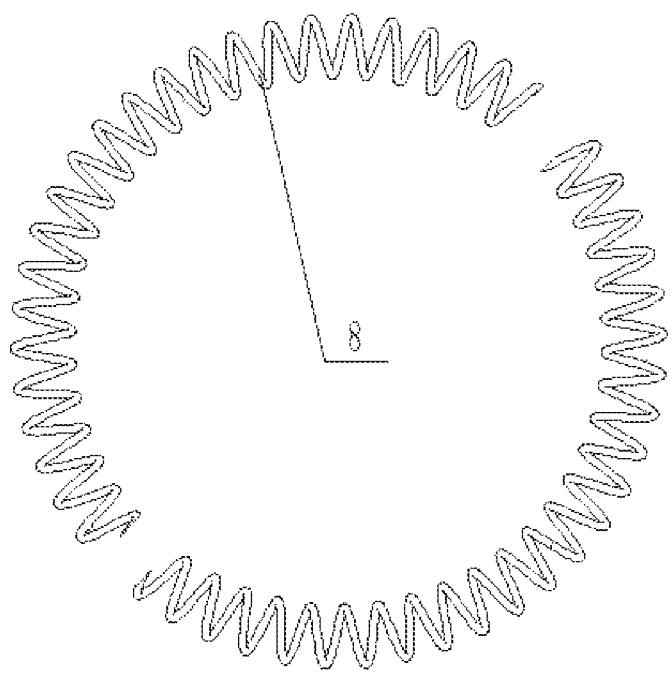
FIG. 6 is a diagram of the bending elastic part of the present invention.

As shown in FIG. 5 and FIG. 6, there are two bending elastic parts, each bending elastic part 8 is a semi-circular structure, and two bending elastic parts are symmetrically arranged with one end of each bending elastic part 8 set on sleeve 9 on both sides of the electromagnetic clutch gear frame 6, and the other end connected with the thrust plate 20. The symmetrically arranged bending elastic part 8 can avoid the mechanical vibration of the soft actuator when it rotates in two directions and ensure that the two directions have the same stiffness setting.

Specifically, the power input shaft 1 is used to input torque, and the torque is transmitted to the electromagnetic clutch gear frame 6 through the clutch output gear 4 firstly, and then transmitted through the thrust plate 20 that is in contact with the bending elastic part. Whether the bending elastic part is connected to the power transfer chain is controlled by changing the on-state of the electromagnetic coil of the electromagnetic clutch. The output stiffness of the soft actuator is adjusted by the stiffness of the bending elastic part. The number of bending elastic parts 8 added to the soft actuator is controlled through the different combinations of the on-state of multiple electromagnetic clutches 2 to realize different stiffness adjustments of the soft actuator.

Figure 16:
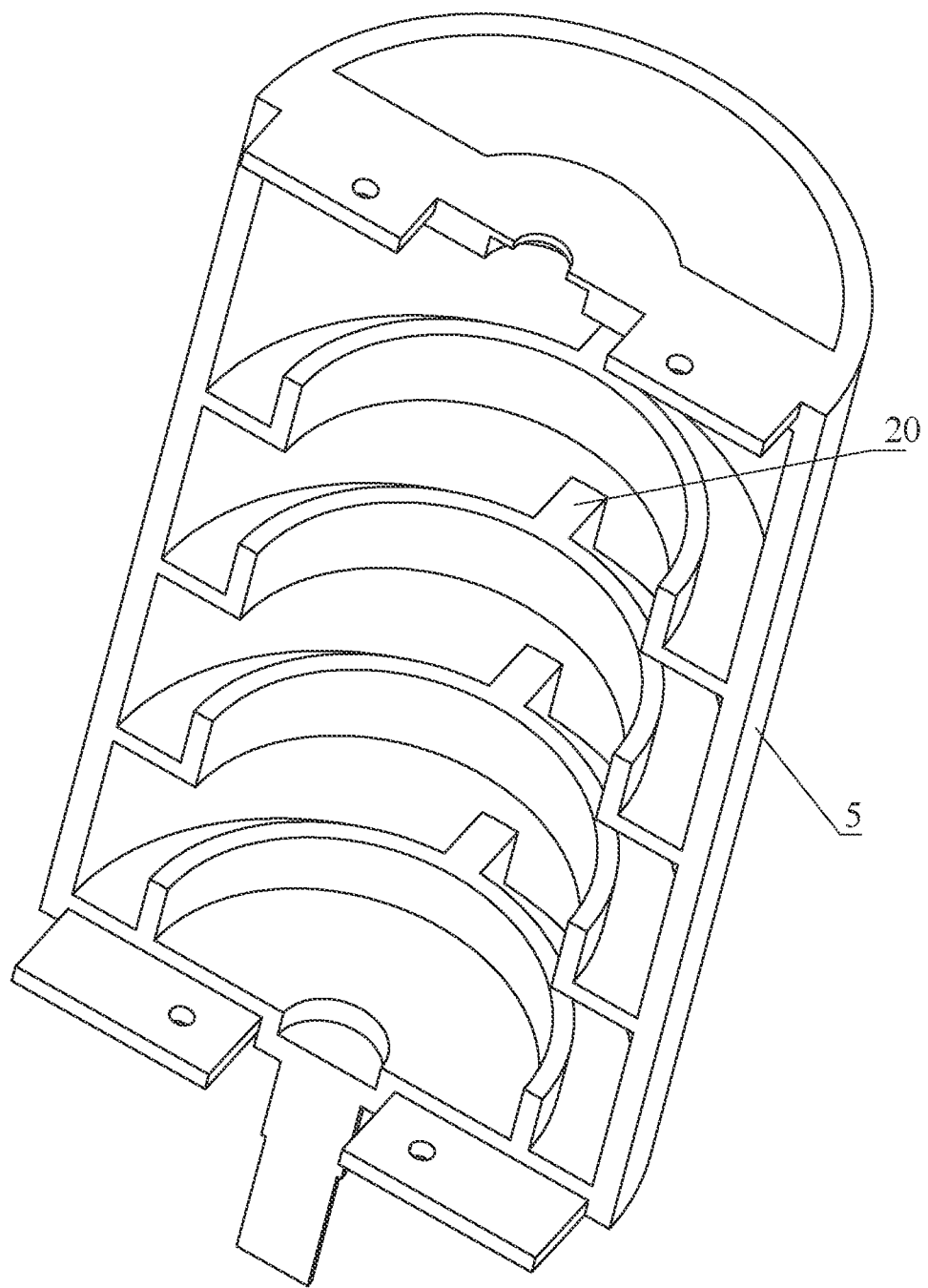
FIG. 16 is a perspective view of one of the outer shells of the present invention.
Figure 17:
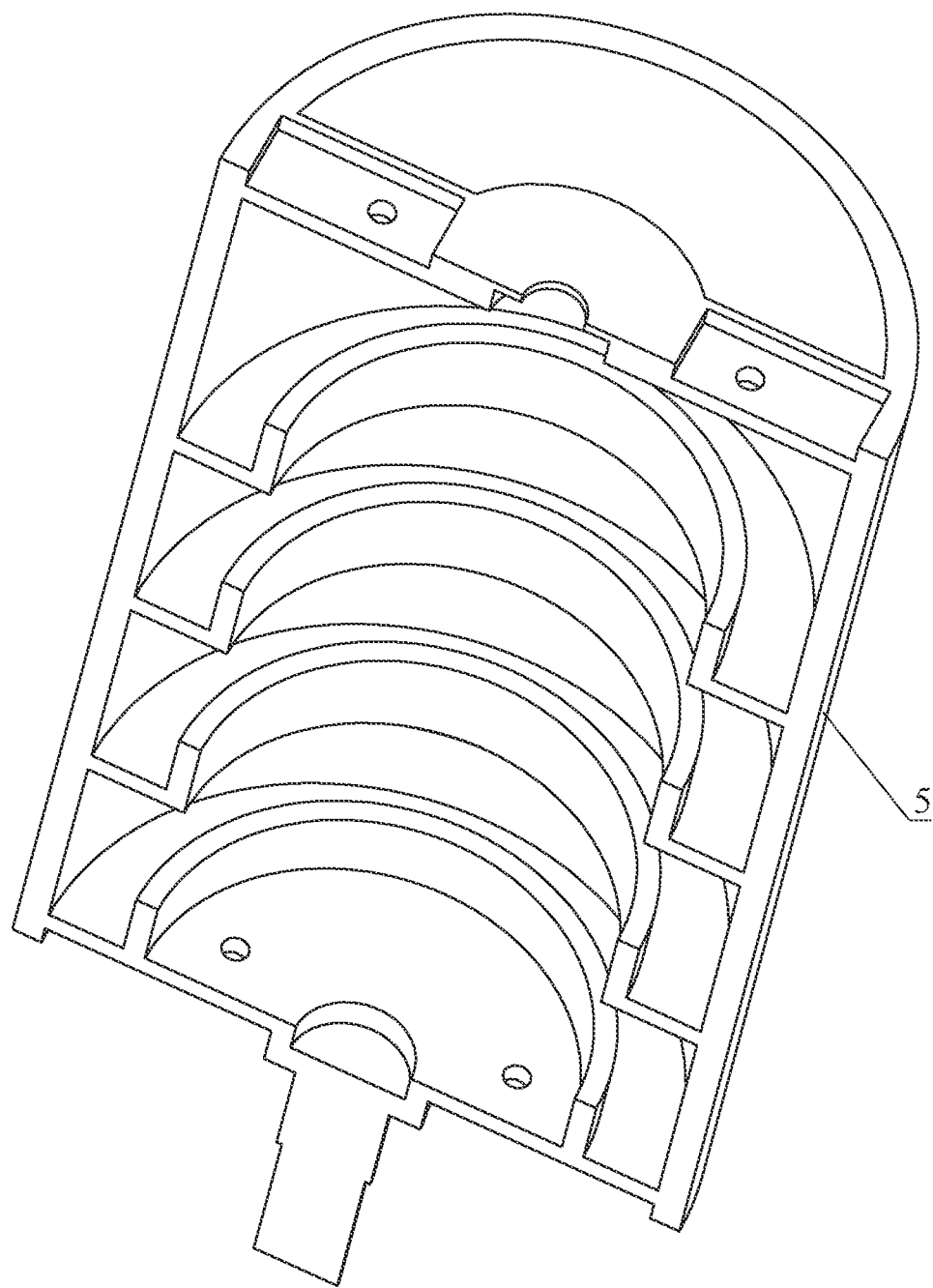
FIG. 17 is a perspective view of another outer shell of the present invention.
Figure 18:
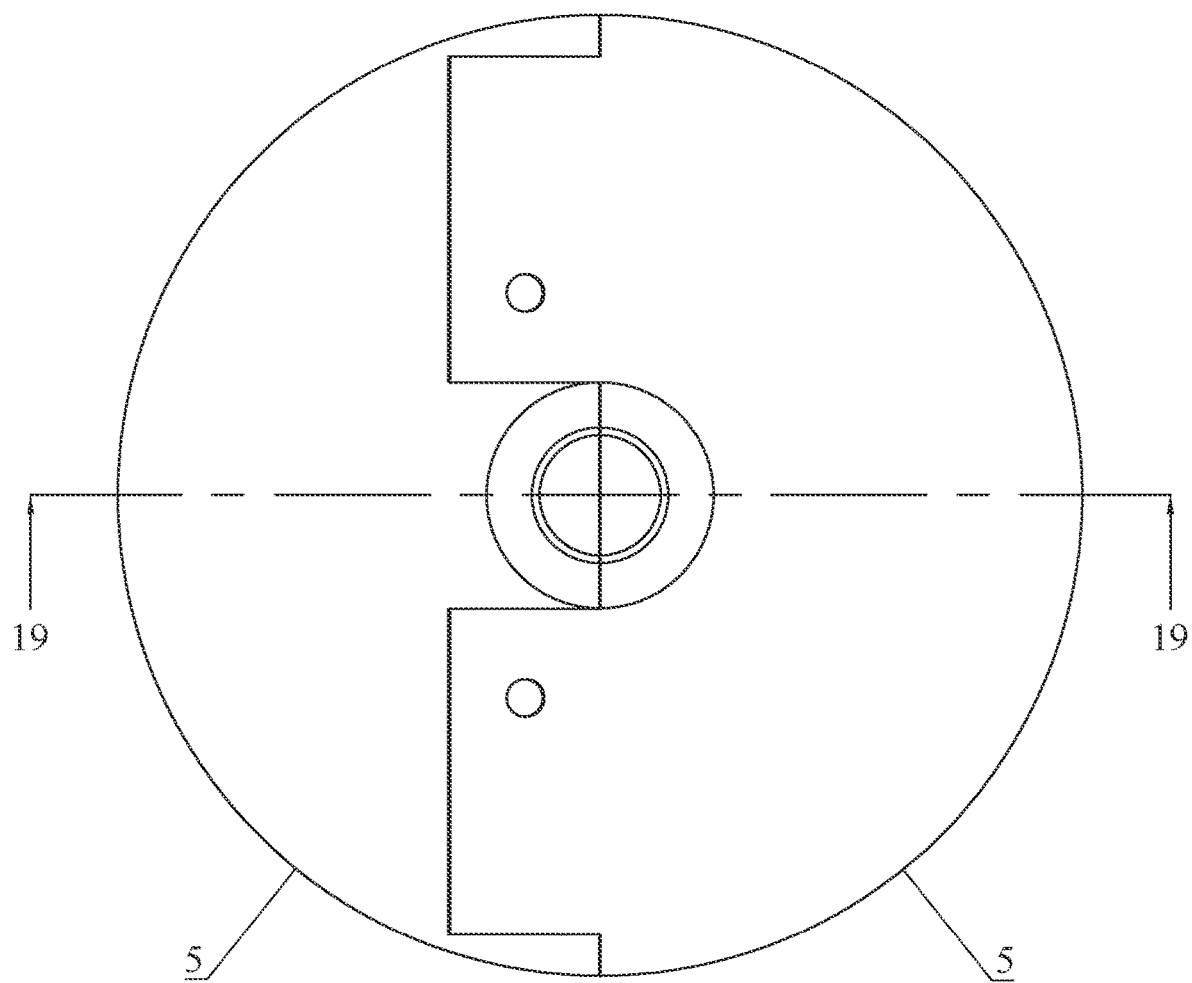
FIG. 18 is a plan view of the assembled outer shells of the present invention.
Figure 19:
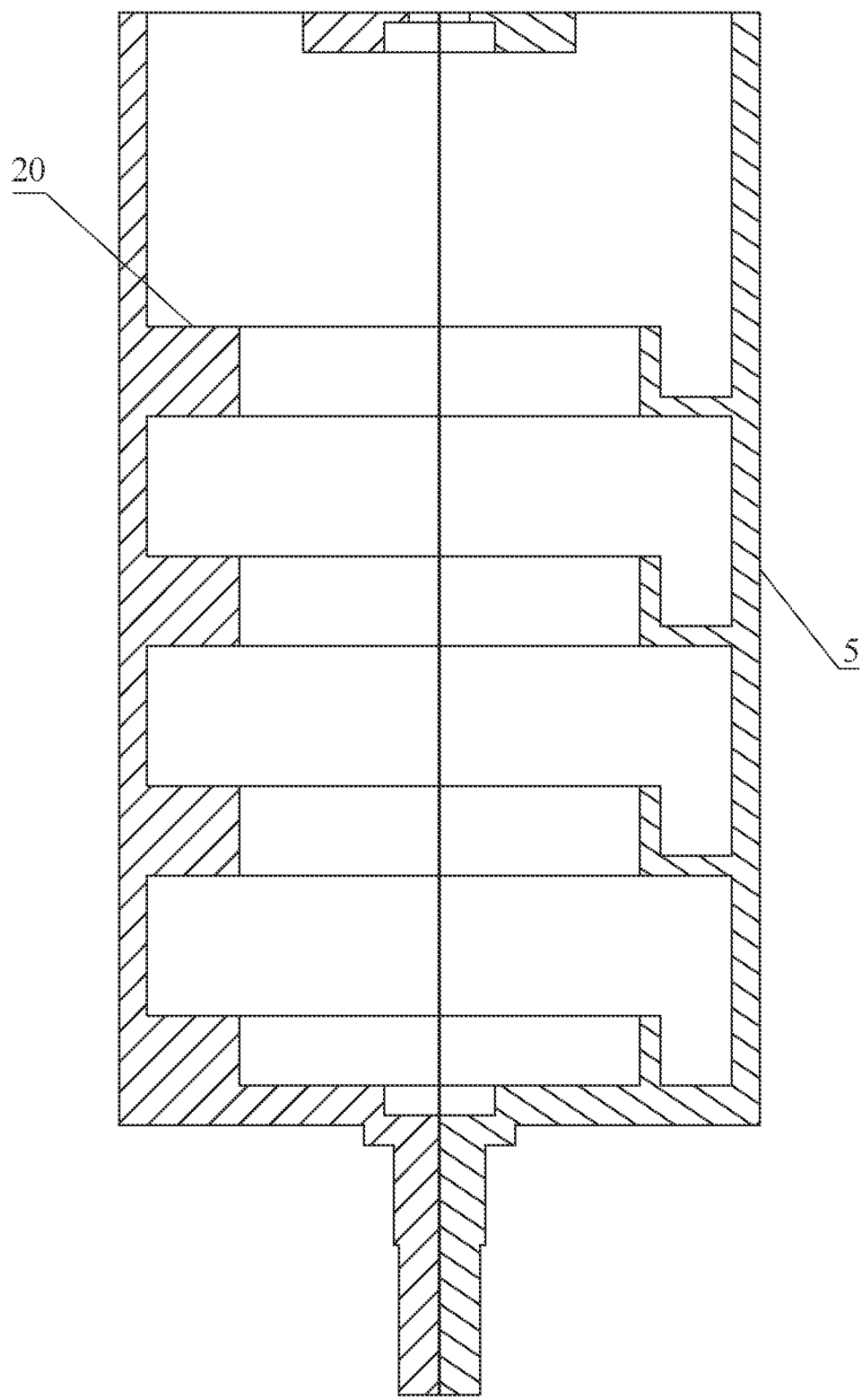
FIG. 19 is a cross sectional view of the assembled outer shells of the present invention taken along the sectional line 19-19 in FIG. 18.

As shown in FIG. 1, the thrust plate 20 is fixed on the outer shell 5, and the outer shell 5 is located outside the electromagnetic clutch 2 so that the torque can be transmitted to the outer shell 5 through the thrust plate 20 and output through the power output shaft 3. The power output shaft 3 is set on one side of the outer shell 5. The power output shaft 3 is connected with the power input shaft 1 in outer shell 5 through the bearing, and the power output shaft is connected with the outer shell. FIGS. 16-19 illustrate the outer shell 5 in greater detail, wherein FIG. 16 illustrates one of the outer shells, FIG. 17 illustrates another outer shell, FIG. 18 illustrates a plan view of the assembled outer shells, and FIG. 19 illustrates a cross-sectional view of the assembled outer shells of the present invention taken along the sectional line 19-19 in FIG. 18. The thrust plate 20 is clearly depicted in FIGS. 16 and 19.

The number of electromagnetic clutch 2 is more than or equal to 3. The number of bending elastic parts added to the soft actuator can be changed through different combinations of the power-on states of each electromagnetic clutch 2, which realize the different stiffness adjustments of the soft actuator.

Figure 2:
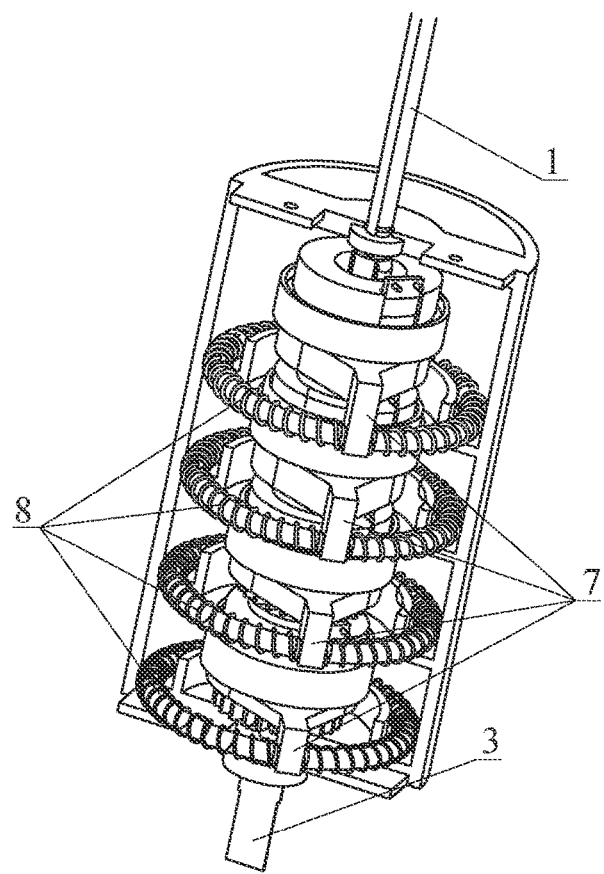
FIG. 2 is a diagram of the stiffness adjustment mechanism of the present invention.

Referring to FIG. 2, this embodiment uses four electromagnetic clutches 2 equidistant coaxially connected in series on the power input shaft 1.

Figure 3:
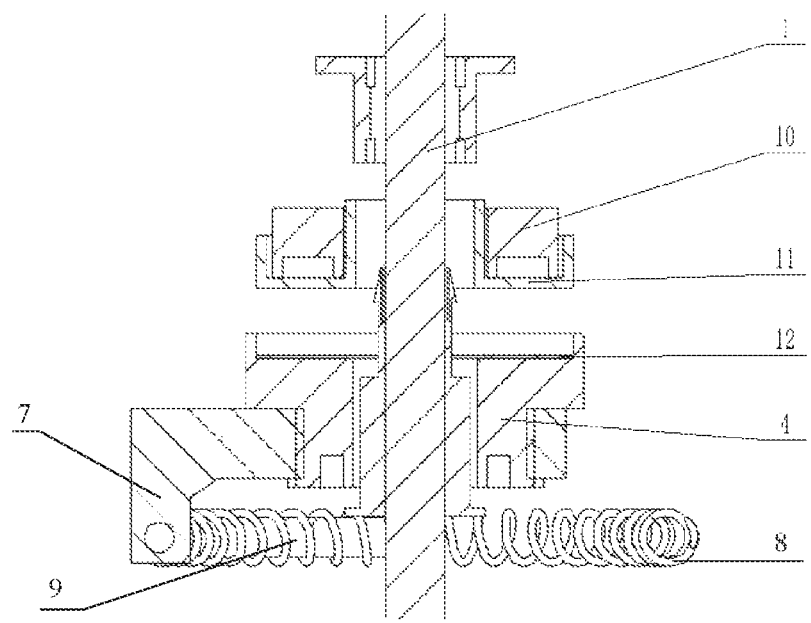
FIG. 3 is an assembly drawing of the stiffness adjustment mechanism of the present invention.

Refer to FIG. 1 and FIG. 3, it can be understood that there are encoders set on the power input shaft 1 and the power output shaft 3 respectively; the power input shaft encoder 14 is used to measure the power input shaft rotation angle 17, and the electromagnetic clutch gear frame 6 is coaxially installed with the flexible output shaft through the coupling to measure the bending elastic part 8 after stiffness adjustment. The difference between the two encoders is the compression deflection angle 19 of the elastic part. The compression deflection angle 19 can be obtained by the difference between the two encoders, and then the output torque of the power output shaft is obtained by the force sensor 21, thereby the relationship between the soft actuator torque and the compression deflection angle 19 can be obtained for the stiffness performance test of the soft actuator.

The power input shaft encoder 14 of this embodiment uses a rotary incremental encoder with gears, which is connected to the power input shaft 1 through gear transmission to measure the rotation angle of the power input shaft 1.

The power input shaft 1 is connected with the driving component, and the driving component of this embodiment adopts the driving motor 13. The driving motor 13 is coaxially installed with the power input shaft 1 and the coupling. Firstly, the motor torque is transmitted to the power input shaft 1 through the coupling, and then it is transmitted to the electromagnetic clutch 2 through the input shaft, finally, it is transmitted to the bending elastic part 8 through the input torque of the electromagnetic clutch gear frame. The output torque of the elastic part finally becomes the driving torque of the outer shell.

The driving component and the encoders are connected to the controller respectively. The controller can be a PID controller, which can be used for the trajectory tracking effect of the soft actuator under different stiffness.

The soft actuator also includes a conductive slip ring 15, the conductive slip ring 15 and the electromagnetic clutch 2 are coaxially mounted on the power input shaft 1, and the conductive slip ring 15 for rotational connectivity of the internal electromagnetic clutch 2 to prevent entanglement caused by lines rotation, so the soft actuator can made unlimited continuous rotation with a wide range of operating angles.

Embodiment 2

This embodiment analyzes the theoretical model of the soft actuator in embodiment 1 and then analyzes the theoretical model of the bending elastic element.

Dynamics Modeling of Soft Actuator:

$$M(\ddot{q})+C(\dot{q})+G(q)+\tau_d(t)=\tau(K_N,\theta_2)$$

$$J_1\ddot{\theta}_1+D_1\dot{\theta}_1+\tau(K_N,\theta_2)=\mu$$

$$\theta_2=\theta_1-q$$

where q, $\theta_1$, $\theta_2$ are respectively the bending elastic part 8, power input shaft rotation angle 17, and the compression deflection angle 19, M, J are respectively the reflection inertia of the power output shaft and the power input shaft, C, D are respectively the equivalent damping coefficients of the power output shaft and the power output shaft, G(q) is used to compensate the gravity torque of the power output shaft, $\tau d(t)$ is used to compensate the load torque of the soft actuator during operation, the additional torque generated by friction, the internal damping and the uncertain disturbance torque caused by the manufacturing accuracy of the soft actuator. μ represents the equivalent torque on the driving motor, and $\tau(\gamma, \theta_2)$ is the elastic torque of the bending elastic part 8.

The value of τ is derived from $\tau=K_N\times\theta_2$, where $K_N$ is the output stiffness of the soft actuator.

Figure 9A:
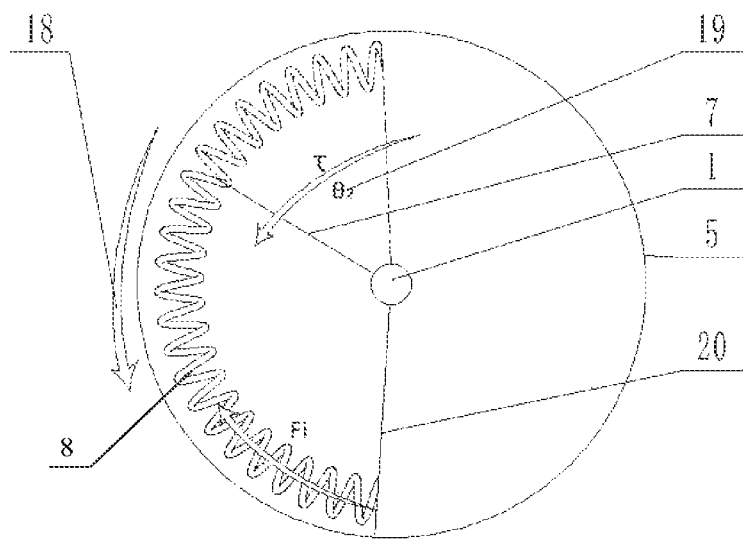
FIG. 9A is the torque-compression angle analysis diagram of the bending elastic part of the present invention.
Figure 9B:
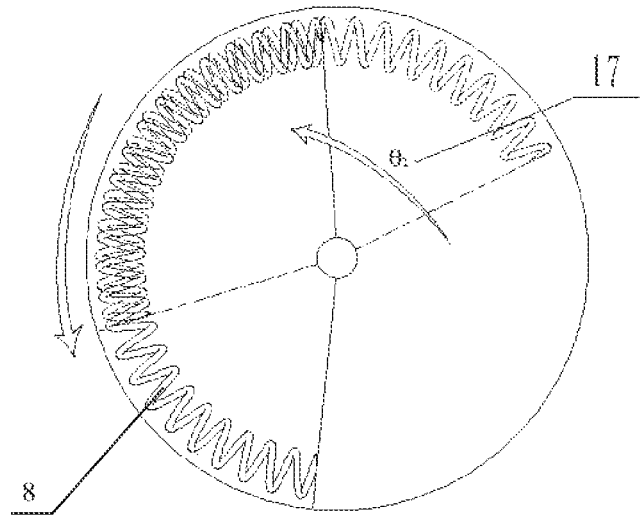
FIG. 9B is the angular displacement diagram of the bending elastic part of the present invention.

Referring to FIG. 9 and FIG. 10, the diagram of the i-th bending elastic part 8 (four bending elastics 8 are used for unidirectional rotation, i=1 to 4), four bending elastics are used for reverse rotation and eight bending elastics 8 are mounted on the soft actuator. The driving torque of the output frame is counterclockwise and the bending elastic part is compressed at a deflection angle of $\theta_2$. According to Hooke's law:

$$\tau = K \times \theta_2 = Fi \times r$$

-continued $$K = \frac{\theta_2}{F_i \times r} = \frac{\theta_2}{\tau}$$

$$K_N = \sum_{i=1}^{4} K_i$$

Fi is the reaction force of the thrust plate 20, r is the distance from the center of the power input shaft 1 to the bending elastic part 8 (0.026 m), and K is the stiffness of a single bending elastic part (Nm/rad).

The output stiffness of the soft actuator is the combined action of four bending elastic parts 8. To prevent damage to the soft actuator, an electromagnetic clutch 2 is normally closed, and the corresponding bending elastic part 8 (K2) is controlled to access the system. The other three bending elastic parts 8 are arranged and combined. The soft actuator has a total of 8 different stiffness output states. The theoretical stiffness values of the bending elastic parts are shown in Table 1-1:

| Output stiffness no | Theoretical stiffness value |
|---|---|
| K1 | 0.5 |
| K2 | 1.2 |
| K3 | 2.4 |
| K4 | 4.8 |

Bending elastic parts 8 theoretical energy storage formula:

$$Ep_i = \frac{K_i \times \theta_2^2}{2}$$

(i = 1 to 4)

Figure 10A:
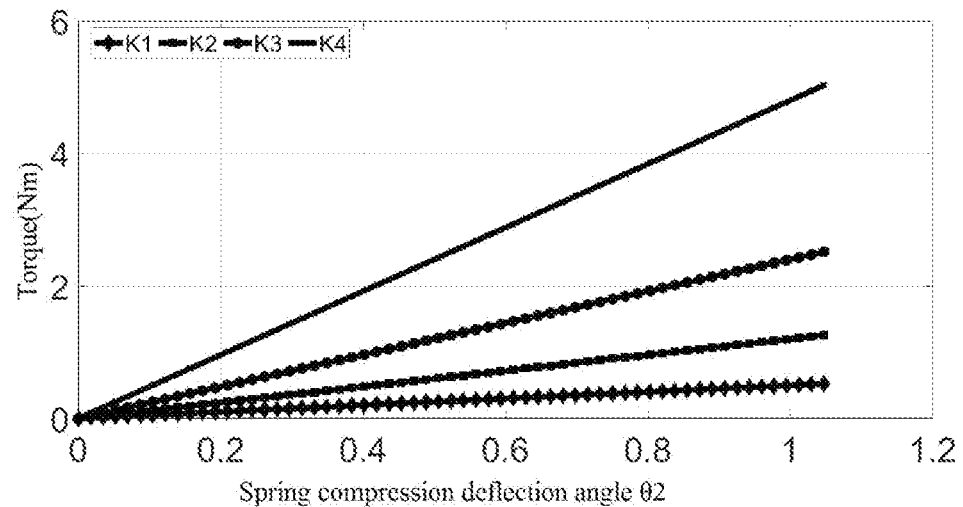
FIG. 10A is a diagram of the bending elastic part's torque of the present invention changing with the deflection angle.
Figure 10B:
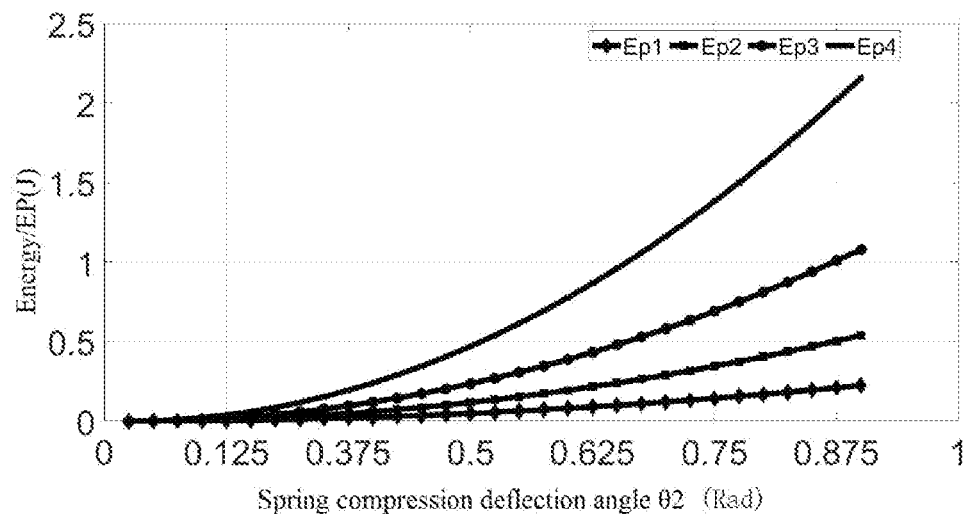
FIG. 10B is an elastic potential energy diagram of the bending elastic part of the present invention varying with the deflection angle.

Finally, the results of the change of the torque of the bending elastic part with the deflection angle and the elastic potential energy of the bending elastic part with the deflection angle are shown in FIG. 10A and FIG. 10B.

Figure 11:
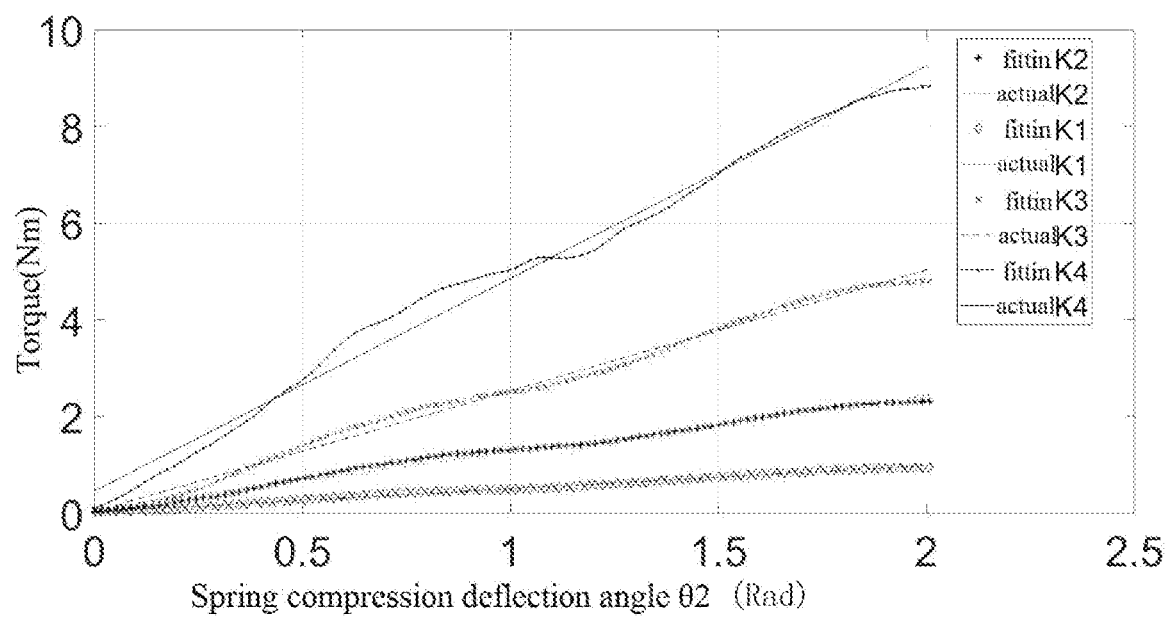
FIG. 11 is a diagram of the torque-compression angle curve for experimental study.

Experimental Study:

For the bending elastic parts 8 with different stiffness, measure the relationship between the torque and the deflection angle of the soft actuator. The torque of the actuator is measured by the force sensor, and the compression deflection angle $\theta_2$ can be obtained by the difference between the input shaft encoder and the soft output shaft encoder. The solid line in FIG. 11 represents the actual test stiffness, and the point line represents the curve result. The results show that the theoretical curve is in good agreement with the experimental curve. Table 2-1 is a linear fit: f(x)=p1×x+p2, fit stiffness curve parameters are shown in Table 2-1:

TABLE 2-1 soft actuator output stiffness fitting curve table

| Number | P₁ | P₂ |
|---|---|---|
| Poly K1 | 0.4802 (0.4733, 0.487) | 0.02535 (0.0173, 0.03339) |
| Poly K2 | 1.173 (1.151, 1.195) | 0.08818 (0.06225, 0.1141) |
| Poly K3 | 2.499 (2.46, 2.537) | 0.03294 (−0.01163, 0.07751) |
| Poly K4 | 4.398 (4.31, 4.486) | 0.4578 (0.3547, 0.5609) |

Where K1=0.4802x+0.02535; K2=1.173x+0.08818; K3=2.499x+0.03294; K4=4.398x+0.4578; From FIG. 11 and Table mentioned above, we can get K1=0.4802 Nm/rad, K2=1.173 Nm/rad, K3=2.499 Nm/rad, K4=4.398 Nm/rad. Stiffness adjustment mechanism output stiffness values with a combination of different stiffness bending elastic parts are shown in Table 2-2:

TABLE 2-2

Different stiffness settings of soft actuator

Stiffness no. (Nm/rad)

| | K2 | K2 + K1 | K2 + K3 | K2 + K4 | K2 + K3 + K4 | K1 + K2 + K4 | K1 + K2 + K3 | K1 + K2 + K3 + K4 |
|---|---|---|---|---|---|---|---|---|
| Value | 0.4802 | 1.6532 | 3.672 | 5.571 | 8.07 | 6.0512 | 4.1522 | 8.5502 |

Step Signal Corresponding Test:

The designed soft actuator has two output stiffnesses, lower output stiffness K2 (0.4802 Nm/rad) and higher output stiffness K1+K2+K3 (4.1522 Nm/rad). To obtain better trajectory-tracking experimental results, a PID controller is designed to study the trajectory-tracking effect of the soft actuator under different stiffnesses. The step signal: 0-120 degrees is selected for trajectory tracking experiments, and the PID parameter values are shown in Table 3-1.

TABLE 3-1

PID controller parameters

| PID Parameters | Value |
|---|---|
| Kp | 0.235 |
| Ki | 0.0025 |
| Kd | 0.001 |
| Ts | 0.001 s |

Figure 12A:
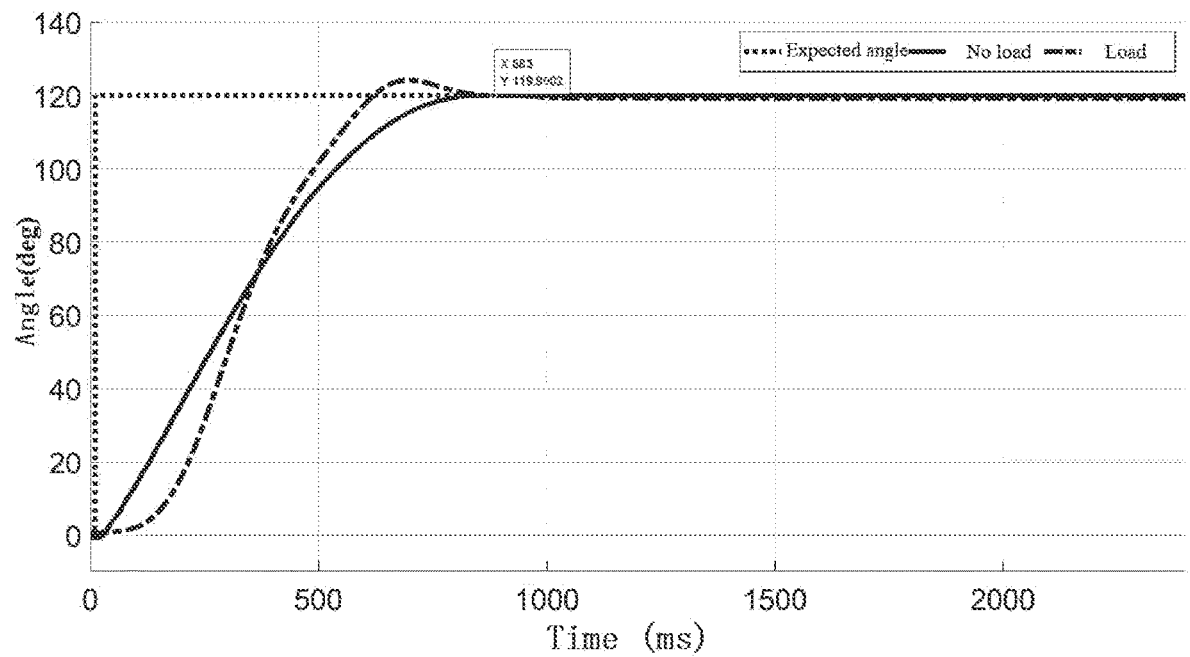
FIG. 12A is a step signal response experiment stiffness K2 (0.4802 Nm/rad) no load and load response comparison curve diagram of embodiment 2.
Figure 12B:
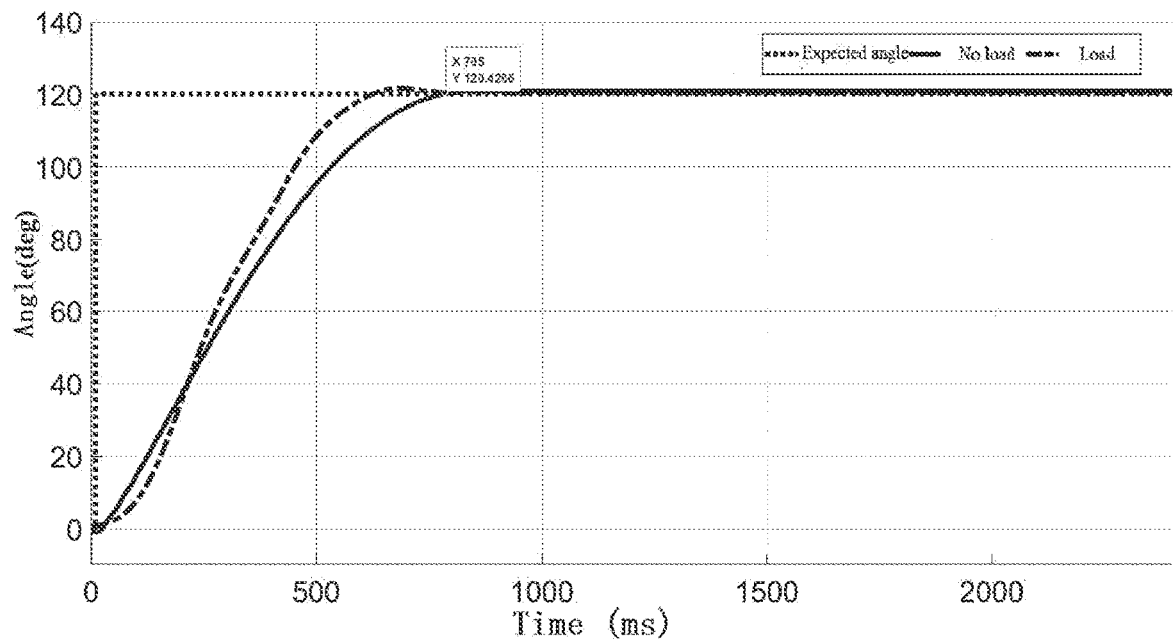
FIG. 12B is a step signal response experiment stiffness K1+K2+K3 (4.1522 Nm/rad) no load and load response comparison curve diagram of embodiment 2.
Figure 13A:
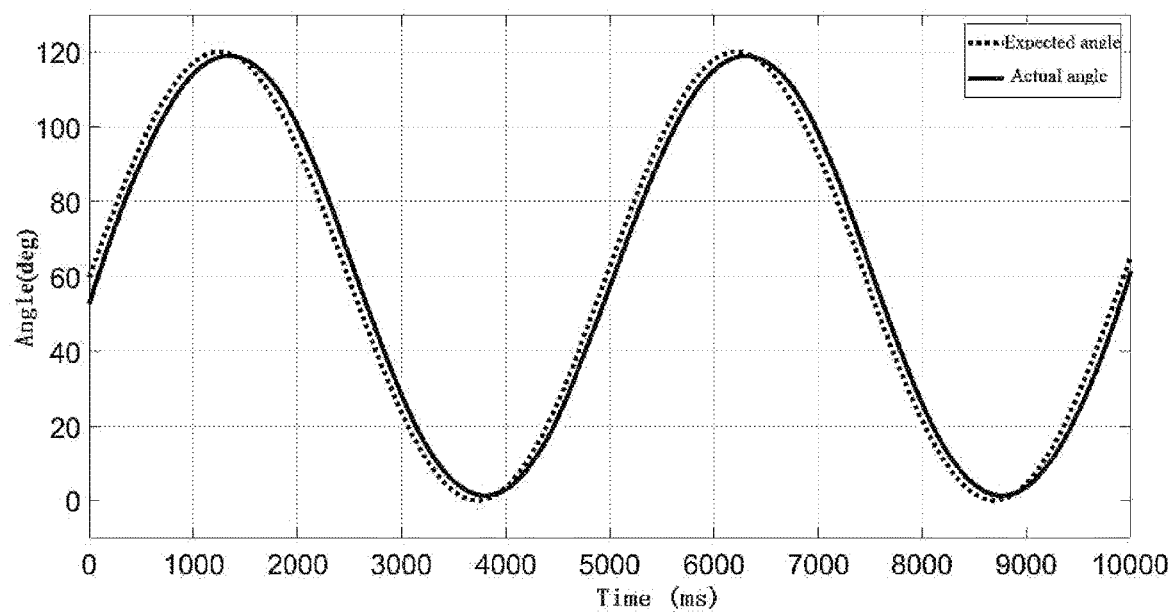
FIG. 13A is a sine signal trajectory tracking test stiffness K2 (0.4802 Nm/rad) no load response curve diagram of embodiment 2.
Figure 13B:
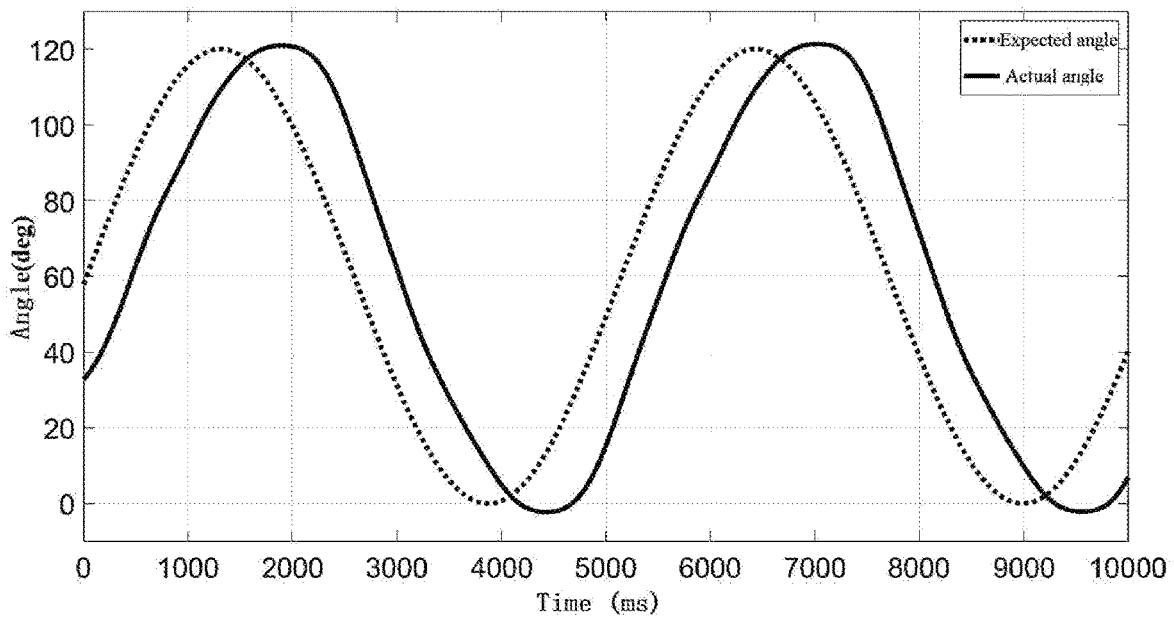
FIG. 13B is a sine signal trajectory tracking test stiffness K2 (0.4802 Nm/rad) load response curve diagram of embodiment 2.
Figure 13C:
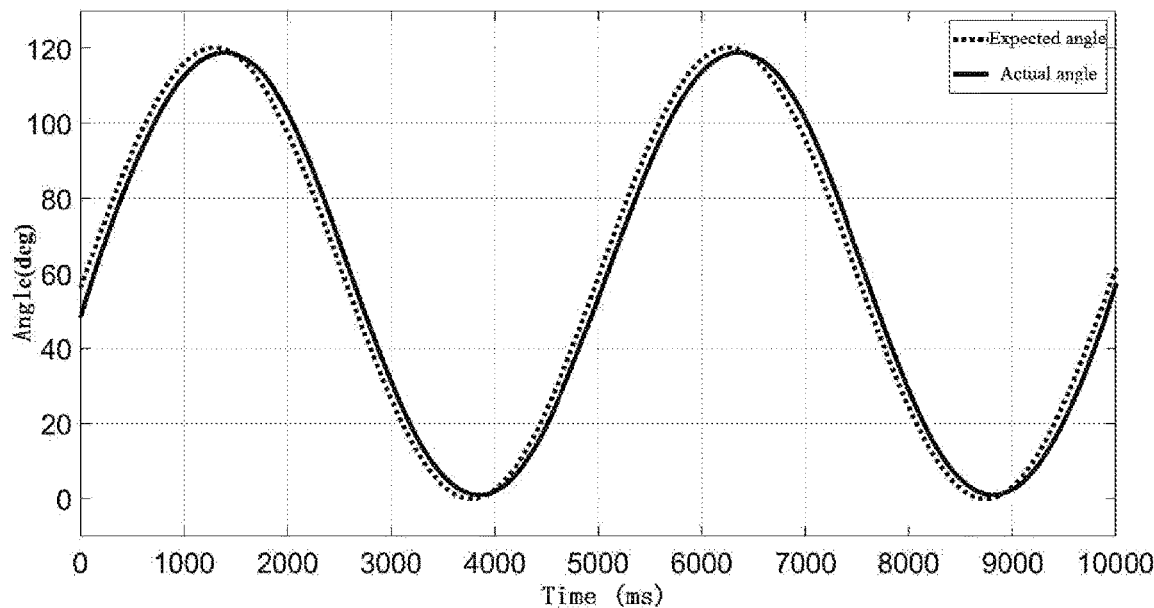
FIG. 13C is a sine signal trajectory tracking test stiffness K1+K2+K3 (4.1522 Nm/rad) no load response curve diagram of embodiment 2.
Figure 13D:
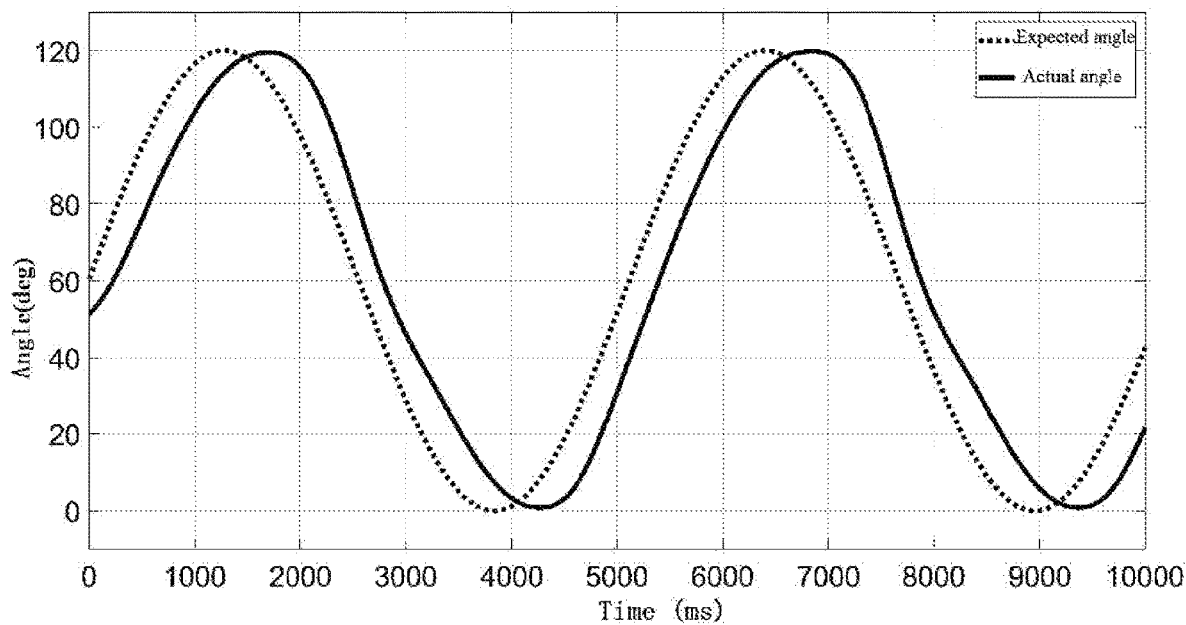
FIG. 13D is a sine signal trajectory tracking test stiffness K1+K2+K3 (4.1522 Nm/rad) load response curve diagram of embodiment 2.
Figure 14:
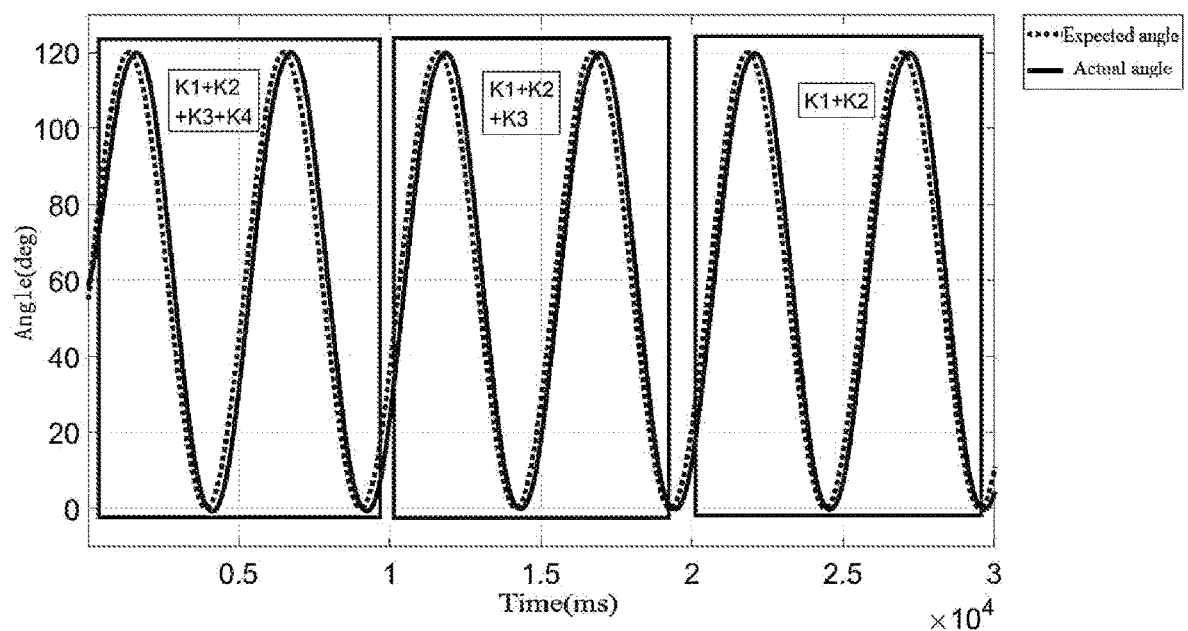
FIG. 14 is a diagram of the continuous variable stiffness response curve of embodiment 2 of the present invention.

The experimental results of step response are shown in FIG. 12A-FIG. 12B. It can be seen that under the condition of low stiffness, the position step response period is 883 ms, and the steady-state error is almost zero. With the increase of stiffness value, the number of bending elastic part 8 of the soft actuator is also increasing. In the case of higher stiffness, the response period is reduced to about 785 ms, and the steady-state error is almost zero, indicating that the step response of the designed soft actuator has a good position control effect under no load, and load, high output stiffness, and low output stiffness.

Sine Signal Trajectory Tracking Experiment:

Test for the sinusoidal signal target tracking performance of soft actuator under fixed stiffness, signal selection: sinusoidal signal: Use $$y = 60\sin\frac{2\pi}{5}t \; (0 \text{ ms} < t < 10000 \text{ ms}):$$

to perform trajectory tracking experiments, excitation signal parameters are set as shown in Table 4-1:

TABLE 4-1

Parameter setting of the sine signal

| Signal source | Sampling frequency | ω | Phase angle |
|---|---|---|---|
| Sine | 0.001 s | 2π/5 | 0° |

As shown in FIG. 13A-FIG. 13D, in the case of no load, the performance of the two different stiffnesses in trajectory tracking performance is similar. Both the lower stiffness and the higher stiffness performed well in the position control effect with lower tracking errors. Because the load interference is very small in this case, under the same load condition, the tracking error of the actuator with a lower stiffness output state is always greater than that of the soft actuator with higher stiffness output state, but both have good tracking trend, indicating that the sinusoidal function tracking of the designed soft actuator has a relatively stable position control effect and performance under no load and load conditions.

Continuous Variable Stiffness Experiment:

When there is no load, adjust the stiffness of the soft actuator from higher stiffness K1234 (K1+K2+K3+K4, 8.5502 Nm/rad) to lower stiffness K12 (K1+K2, 1.6532 Nm/rad) during the sinusoidal function tracking $$y = 60\sin\frac{2\pi}{5}t \,(0 \text{ ms} < t < 30000 \text{ ms}):.$$

As shown in FIG. 14, 0-10 s is the response curve of higher stiffness, 10-20 s is the response curve of medium stiffness, and 20-30 s is the response curve of lower stiffness. It can be seen from the experimental results that the curve-tracking effect is better when there is no load. It also can be seen that the designed actuator can continuously adjust the output stiffness during the stiffness transformation, and there is almost no mechanical disturbance during the stiffness adjustment.

Collision Safety Experiment:

To fully detect the adaptability and safety of the soft actuator, a collision test was performed on the designed soft actuator with ten collisions.

Figure 15A:
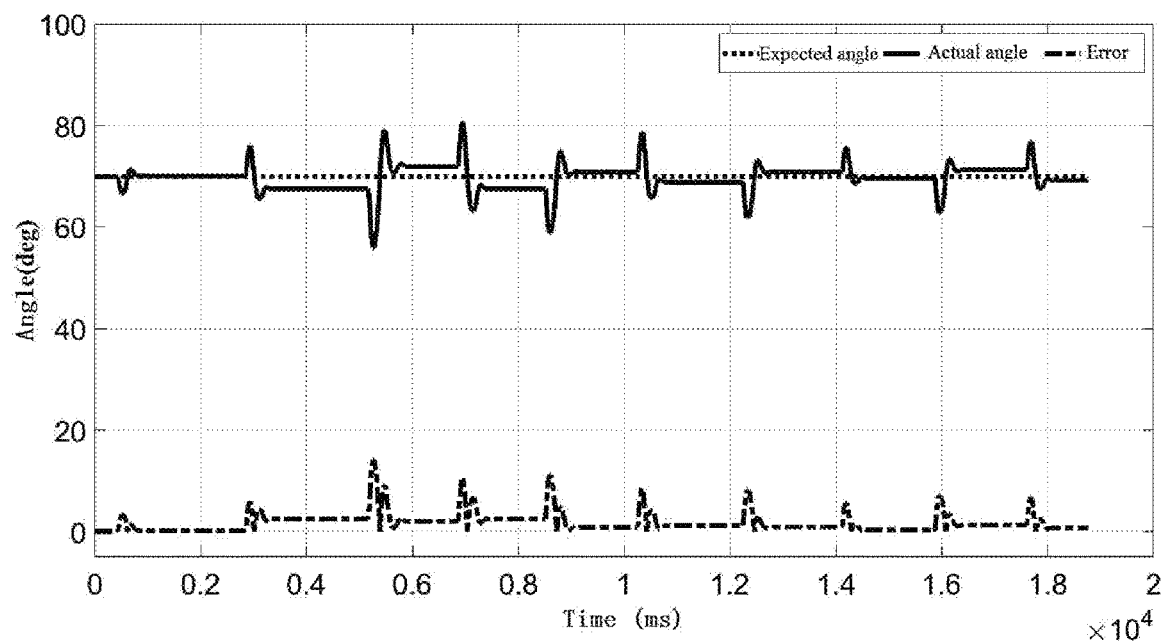
FIG. 15A is the stiffness K12 (1.6532 Nm/rad) anti-interference test curve diagram of embodiment 2 of the present invention.
Figure 15B:
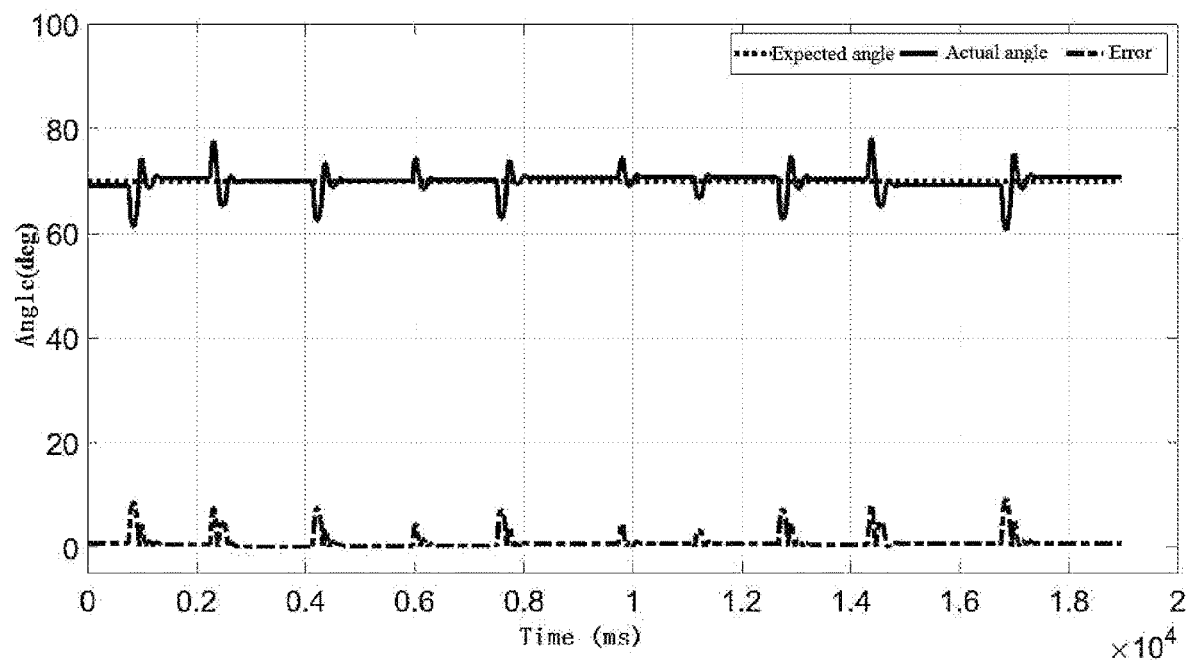
FIG. 15B is the stiffness K123 (4.1522 Nm/rad) anti-interference test curve diagram of embodiment 2 of the present invention.
Figure 15C:
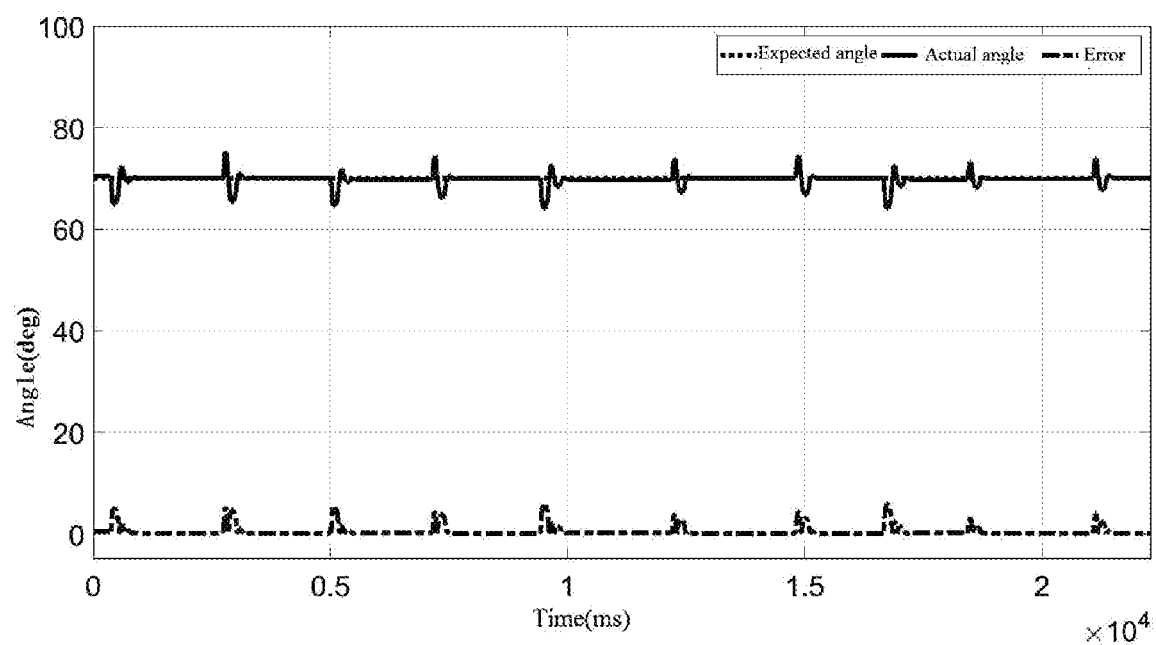
FIG. 15C is the stiffness K1234 (8.5502 Nm/rad) anti-interference test curve diagram of embodiment 2 of the present invention.

As shown in FIG. 15A-FIG. 15C, the anti-disturbance performance is better when the stiffness is higher. When the stiffness is low, it shows good flexibility, which verifies that the soft actuator can effectively adapt to external shocks.

Firstly, analyze the stiffness adjustment principle and mechanical structure design of the soft actuator, and establish its mathematical model, the relationship between the torque and the spring displacement angle is obtained after testing the static stiffness performance of the soft actuator. Then, carry out the actuator step signal tracking experiment to verify the target angle tracking effect of the soft actuator, and the sine signal trajectory tracking experiment is also carried out to verify the tracking performance of the soft actuator in the fixed stiffness output state. Finally, carry out the continuous variable stiffness experiment to verify the variable stiffness performance and the collision safety experiments to verify the shock absorption and energy storage capacity of the soft actuator.

Embodiment 3

The present invention also discloses a working method of the soft actuator, including the following contents:

When the electromagnetic coil 10 is energized, a certain magnetic force is generated to adsorb the passive friction disc 12 on the active friction disc 11, and the torque of the power input shaft is transmitted to the passive friction disc 12 through two friction discs. Finally, the torque is transmitted from the clutch output gear 4 to the electromagnetic clutch gear frame 6 and then transmitted to the outer shell 5 through the thrust plate in contact with the bending elastic part 8.

When the electromagnetic coil 10 is powered off, the coil of electromagnetic clutch 2 loses its magnetic force, at the same time, the passive friction disc 12 and the active friction disc 11 are separated and the power transmission is interrupted. The electromagnetic coil 10 and the active friction disc 11 will rotate independently with the power input shaft 1. After the power state change of the electromagnetic coil 10, by connecting or disconnecting the bending elastic part 8 to the power transmission chain is controlled, the output stiffness of the soft actuator is adjusted by the stiffness of the bending elastic part.

When the bending spring with relatively small stiffness is connected to the soft actuator, the output stiffness of the soft actuator approaches infinity. When the completely rigid component is connected to the soft actuator, the output stiffness of the soft actuator is almost infinite. At this moment, the output stiffness of the soft actuator depends on the choice of different stiffness materials of the bending elastic element.

Specifically, the number of soft actuators connected to multiple elastic parts is controlled by the electromagnetic clutch to realize the adjustment of output stiffness by turning on or off the electromagnetic clutch 2 and adding or separating the corresponding bending elastic parts from the soft actuator.

Embodiment 4

The present invention also provides a robot that works by using the soft actuator in embodiment 1.

The above-mentioned embodiments are only the preferred embodiments of the present invention which are not used to limit the present invention. For technicians in this field, the present invention could have various changes and variations. Any modification, equivalent substitution, improvement, etc. made within the spirit and principles of the present invention shall be included within the protection scope of this invention.

What is claimed is:

1. A soft actuator, comprising:
   a power input shaft,
   wherein a plurality of electromagnetic clutches are coaxially connected in series to the power input shaft,
   wherein each electromagnetic clutch of the plurality of electromagnetic clutches comprises a bending elastic part arranged between a thrust plate and an electromagnetic clutch gear frame comprising arc sleeves,
   each of the bending elastic parts is installed on and surrounding the arc sleeves of the electromagnetic clutch gear frame and contacts with a baffle of the electromagnetic clutch gear frame,
   each bending elastic part is connected with a clutch output gear of each of the plurality of electromagnetic clutches through the electromagnetic clutch gear frame,
   the electromagnetic clutch gear frame is fixedly connected with the clutch output gear and rotates coaxially; and
   each bending elastic part added to the soft actuator is configured to realize different stiffness adjustments of the soft actuator through different combinations of power-on states of each electromagnetic clutch.

2. The soft actuator according to claim 1, wherein the electromagnetic clutch gear frame is securely connected to the clutch output gear using an internal and external gear with a same modulus.

3. The soft actuator according to claim 1, wherein the soft actuator comprises two bending elastic parts arranged symmetrically with one end of each bending elastic part set on both ends of the arc sleeves of the electromagnetic clutch gear frame and the other end contacted with the thrust plate.

4. The soft actuator according to claim 1, wherein the thrust plate is fixed to an outer shell which is disposed outside the electromagnetic clutch.

5. The soft actuator according to claim 4, wherein
a power output shaft is arranged on one side of the outer shell; and
a force sensor mounted on the power output shaft is further comprised to measure an output torque of the power output shaft.

6. The soft actuator according to claim 5, wherein encoders are set on the power input shaft and the power output shaft, respectively.

7. The soft actuator according to claim 1, wherein the number of electromagnetic clutches is more than or equal to 3.

8. The soft actuator according to claim 1, wherein the soft actuator further comprises a conductive slip ring that is mounted on the power input shaft.

9. The soft actuator according to claim 1,
wherein in the soft actuator comprising the electromagnetic clutch gear frame is securely connected to the clutch output gear using an internal and external gear with a same modulus, wherein the soft actuator is configured to be adapted by a robot.

10. The soft actuator according to claim 1,
wherein the soft actuator comprises two bending elastic parts arranged symmetrically with one end of each bending elastic part set on both ends of the arc sleeves of the electromagnetic clutch gear frame and the other end contacted with the thrust plate, wherein the soft actuator is configured to be adapted by a robot.

11. The soft actuator according to claim 1,
wherein in the soft actuator, the thrust plate is fixed to an outer shell which is disposed outside the electromagnetic clutch, wherein the soft actuator is configured to be adapted by a robot.

12. A working method of the soft actuator according to claim 1, comprising:

when an electromagnetic coil is energized, a generated magnetic force adsorbs a passive friction disc on an active friction disc, a torque of the power input shaft is transmitted to the passive friction disc through the two friction discs, finally, the torque is transmitted from the clutch output gear to the electromagnetic clutch gear frame and then transmitted to the outer shell through the thrust plate in contact with the bending elastic part;
when the electromagnetic coil is powered off, the electromagnetic clutch coil loses its magnetic force, at the same time, the passive friction disc and the active friction disc are separated and a power transmission is interrupted; the electromagnetic coil and the active friction disc will rotate independently with the power input shaft; after a power state change of the electromagnetic coil, whether the bending elastic part is connected to a power transmission chain is controlled, and an output stiffness of the soft actuator is adjusted by a stiffness of the bending elastic part.

13. The working method according to claim 12, wherein in the soft actuator, the electromagnetic clutch gear frame is securely connected to the clutch output gear using an internal and external gear with a same modulus.

14. The working method according to claim 12, wherein the soft actuator comprises two bending elastic parts arranged symmetrically with one end of each bending elastic part set on both ends of the arc sleeves of the electromagnetic clutch gear frame and the other end contacted with the thrust plate.

15. The working method according to claim 12, wherein in the soft actuator, the thrust plate is fixed to an outer shell which is disposed outside the electromagnetic clutch.

16. The working method according to claim 15, wherein in the soft actuator:
a power output shaft is arranged on one side of the outer shell; and
a force sensor mounted on the power output shaft is further comprised to measure an output torque of the power output shaft.

17. The working method according to claim 16, wherein in the soft actuator, encoders are set on the power input shaft and the power output shaft, respectively.

18. The working method according to claim 12, wherein in the soft actuator, a number of electromagnetic clutches is more than or equal to 3.

19. The working method according to claim 12, wherein the soft actuator further comprises a conductive slip ring that is mounted on the power input shaft.

* * * * *